(12) United States Patent
Kato et al.

(10) Patent No.: US 6,801,488 B2
(45) Date of Patent: Oct. 5, 2004

(54) PRE-PIT DETECTING APPARATUS FOR OPTICAL RECORDING MEDIUM

(75) Inventors: Masahiro Kato, Tokorozawa (JP);
Naoharu Yanagawa, Tokorozawa (JP);
Tatsuhiro Yone, Tokorozawa (JP);
Yuko Muramatsu, Tokorozawa (JP);
Shinji Suzuki, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 459 days.

(21) Appl. No.: 10/062,557

(22) Filed: Feb. 5, 2002

(65) Prior Publication Data
US 2002/0114249 A1 Aug. 22, 2002

(30) Foreign Application Priority Data

Feb. 6, 2001 (JP) .......... 2001-030107
Dec. 21, 2001 (JP) .......... 2001-390463

(51) Int. Cl.[7] .......... G11B 5/09
(52) U.S. Cl. .......... 369/47.28; 369/59.17
(58) Field of Search .......... 369/47.19, 47.28, 369/47.35, 53.31, 53.34, 59.17, 59.18, 59.21, 59.25, 59.26, 120, 124.04, 124.07, 124.15

(56) References Cited

U.S. PATENT DOCUMENTS

| | | | | |
|---|---|---|---|---|
| 6,058,093 A | * | 5/2000 | Kato et al. | 369/124.14 |
| 6,272,089 B1 | * | 8/2001 | Kato | 369/53.41 |
| 6,487,149 B1 | * | 11/2002 | Yokoi et al. | 369/47.25 |
| 6,603,726 B1 | * | 8/2003 | Yoshida et al. | 369/124.01 |
| 6,707,780 B2 | * | 3/2004 | Hikima | 369/124.11 |

* cited by examiner

Primary Examiner—Paul W. Huber
(74) Attorney, Agent, or Firm—Sughrue Mion, PLLC

(57) ABSTRACT

A pre-pit detecting apparatus which, when a light beam is radiated onto an optical recording medium having a recording surface with pre-pits repeatedly formed between tracks, receives light reflected by the recording surface with first and second light receiving faces, obtains the push-pull signal corresponding to the light receiving signals for the first and second light receiving faces, samples the push-pull signal to collect sample data for a predetermined period, and sets a threshold value between the maximum value of data corresponding to a track and the minimum value of data corresponding to a pre-pit, of the collected sample data.

11 Claims, 20 Drawing Sheets

PRE-PIT DETECTING APPARATUS FOR OPTICAL RECORDING MEDIUM

BACKGROUND OF THE INVENTION

1. Field of the Invention

The present invention relates to a pre-pit detecting apparatus for an optical recording medium having a recording surface with pre-pits carrying information concerning tracks repeatedly formed between the tracks.

2. Description of the Related Background Art

Recently, CD-R, CD-RW, DVD-R, DVD-RW, DVD-RAM and so on have been widely known as optical recording discs to which information data can be written. In addition, information recording/playing apparatuses to record and reproduce information by using such recording discs have been developed as products.

FIG. 1 is a schematic diagram of the area configuration of a DVD-RW as a recording disc described above.

As is shown in FIG. 1, a DVD-RW disc has a data structure with a PCA (Power Calibration Area), an RMA (Recording Management Area), a lead-in area, data area, and a lead-out area from the inner circumference to the outer circumference of the disc. The PCA is an area for trial writing to determine the recording power of the laser beam and the RMA is an area in which management information related to recording is written. The lead-in area is provided with an embossed area formed as its part. The embossed area has phase pits formed on the disc in advance and sometimes records the information related to copy prevention.

FIG. 2 is a diagram of a part of the recording surface of such recordable disc.

As shown in FIG. 2, a disc substrate 101 has convex groove tracks 103 where information pits (marks) Pt to carry information data are to be formed spirally or concentrically, as well as concave land tracks 102 formed alternately on the board. Several LPPs (land pre-pits) 104 are formed between the adjacent groove tracks 103. The LPPs 104 are previously provided on the land tracks 102 to indicate recording timing and addresses of information data recorded by a disc recorder. The LPPs are formed as pits from the side of the disc substrate 101.

A disc player which plays an optical disc having such LPP's is provided with an LPP detection circuit. The LPP detection circuit is configured with a binarization circuit. Using its pickup, it receives the beam reflected from the optical disc with a light detector divided, for example, into two parts in the track tangent direction, and obtains the differential signal of the output signals from that optical detector, or the radial push-pull signal PP. The push-pull signal PP has a waveform as shown in FIG. 3 and the LPP component is a component projecting from the push-pull signal PP. Thus, by comparing the level of the push-pull signal PP and a threshold, a pre-pit detection signal $PP_D$ to indicate the detection of an LPP can be generated.

The pre-pit detection signal $PP_D$ has, as shown in FIG. 4, a level change like a pulse generated at every pickup reading position corresponding to an LPP. As shown in FIG. 4, a sync pulse $P_{SYNC}$, which appears for every cycle T, is contained in the pre-pit detection signal $PP_D$. The sync pulse $P_{SYNC}$ is followed by two pre-data pulses with a certain interval, but they do not always exist in every cycle to represent an address or other data. In FIG. 4, the third pulse from the sync pulse $P_{SYNC}$ is the pre-data pulse $PP_D$ to carry the sector address. When recording information to an optical disc, the address on the optical disc is detected based on this pre-pit detection signal $PP_D$ for information recording.

However, even though the LPP and other pre-pits carry the addresses that are so important in information recording, the level of the section corresponding to the pre-pit in the push-pull signal is not constant. It is known to fluctuate depending on the pickup reading conditions such as tracking position. Therefore, it is difficult to set the threshold appropriately to binarize the push-pull signal.

SUMMARY OF THE INVENTION

An object of the present invention is to provide a pre-pit detecting apparatus which can appropriately set a threshold value for detecting a pre-pit component from a push-pull signal.

According to the present invention, there is provided a pre-pit detecting apparatus for an optical recording medium having a recording surface provided with pre-pits which are repeatedly formed between tracks and carries information related to the tracks, comprising: an optical detector having a light receiving surface divided into a first and second light receiving faces in the tangential direction of the track, for receiving the reflected light of a light beam radiated onto the recording surface on the first and second light receiving faces to output first and second light detection signals corresponding to respective amounts of the received light on the first and second light receiving faces; a subtractor for calculating the difference between the first and second light detection signals output from the optical detector to generate a push-pull signal; a binarization device for comparing the push-pull signal with a threshold value to generate a pre-pit detection signal; and a threshold setting device for sampling the push-pull signal to collect sample data for a predetermined period and for setting the threshold value between the maximum value of data corresponding to a track and the minimum value of data corresponding to a pre-pit, of the collected sample data.

According to the present invention, there is provided a pre-pit detection method for an optical recording medium having a recording surface provided with pre-pits which are repeatedly formed between tracks and carries information related to the tracks, comprising: an optical detection step for receiving the reflected light of a light beam radiated onto the recording surface, on a light receiving surface having first and second light receiving faces divided in the tangent direction of the track, to output first and second light detection signals corresponding to respective amounts of the received light on the first and second light receiving faces; a subtraction step for calculating the difference between the first and second light detection signals to generate a push-pull signal; a binarization step for comparing the push-pull signal with a threshold value to generate a pre-pit detection signal; and a threshold setting step for sampling the push-pull signal to collect sample data for a predetermined period and for setting the threshold value between the maximum value of data corresponding to a track and the minimum value of data corresponding to a pre-pit, of the collected sample data.

According to the present invention, there is provided a computer data signal embodied in a carrier wave and representing a series of instructing which cause a computer to perform steps to execute an detecting process in a pre-pit detecting apparatus for an optical recording medium having a recording surface provided with the pre-pits which are repeatedly formed between tracks and carries information related to said tracks, the steps comprising an optical detection step for receiving the reflected light of a light beam radiated onto the recording surface, on a light receiving surface having first and second light receiving faces divided in the tangent direction of the track, to output first and second light detection signals corresponding to respective amounts of the received light on the first and second light receiving faces; a subtraction step for calculating the difference between the first and second light detection signals to generate a push-pull signal; and a binarization step for comparing the push-pull signal with a threshold value to generate a pre-pit detection signal, the steps further comprising: a threshold setting step for sampling the push-pull signal to collect sample data for a predetermined period and for setting the threshold value between the maximum value of data corresponding to a track and the minimum value of data corresponding to a pre-pit, of the collected sample data.

BRIEF DESCRIPTION OF THE DRAWINGS

FIG. 5 is a block diagram of an information recording/reproducing apparatus which the present invention applies to;

DETAILED DESCRIPTION OF THE PREFERRED EMBODIMENTS

Referring to the attached figures, the preferred embodiments of the present invention will be described in detail below.

Figure 1:
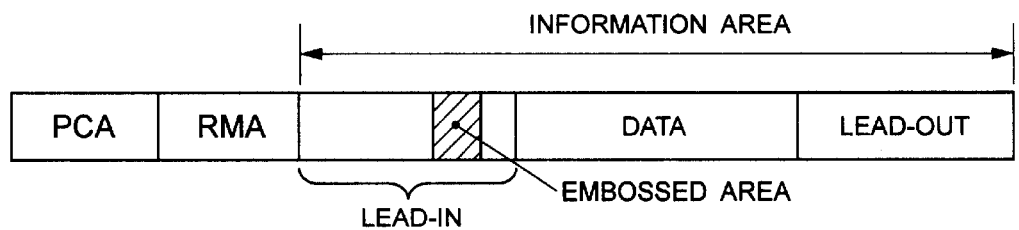
FIG. 1 is a diagram of the layout structure of the areas of a DVD-RW.
Figure 2:
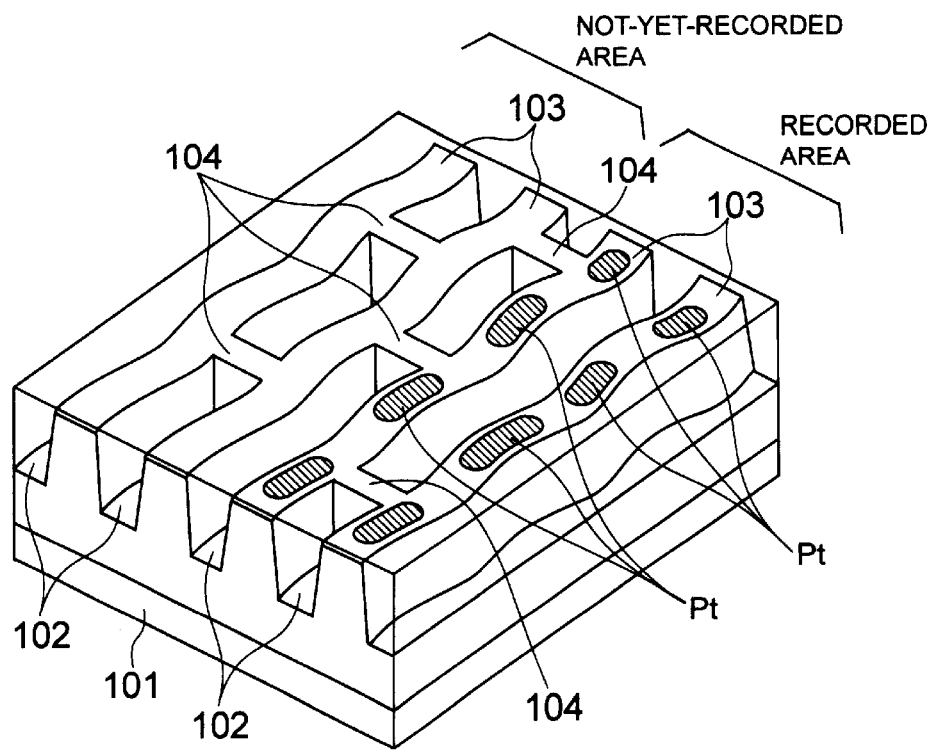
FIG. 2 is a diagram of the structure of the recording surface of a DVD-RW.
Figure 3:
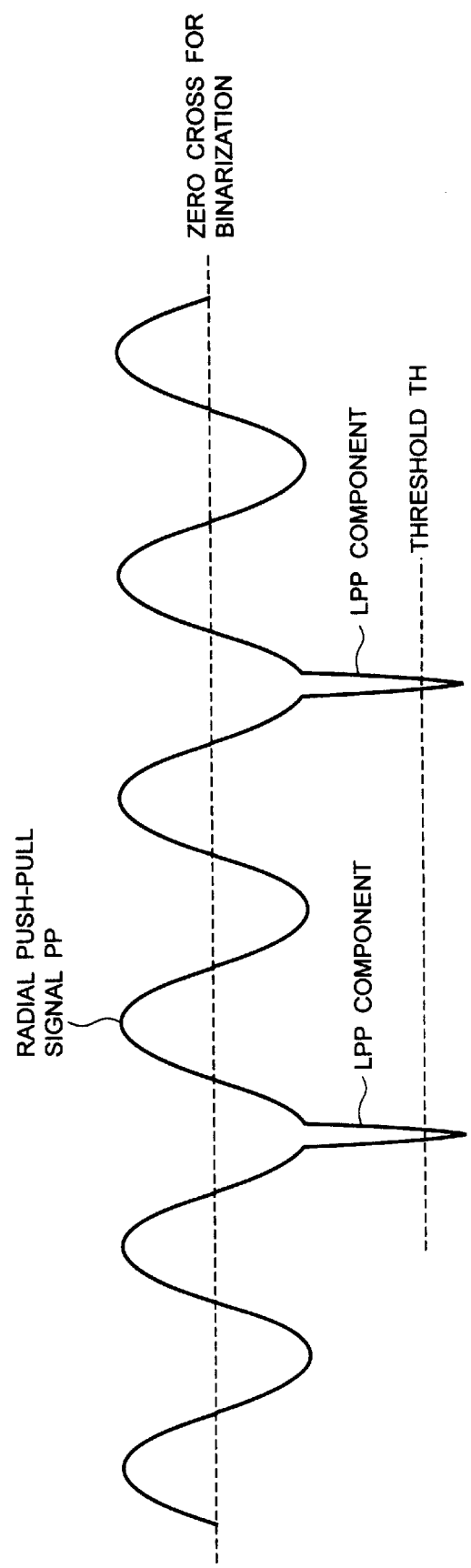
FIG. 3 is a diagram of a waveform of a radial push-pull signal containing a LPP component.
Figure 5:
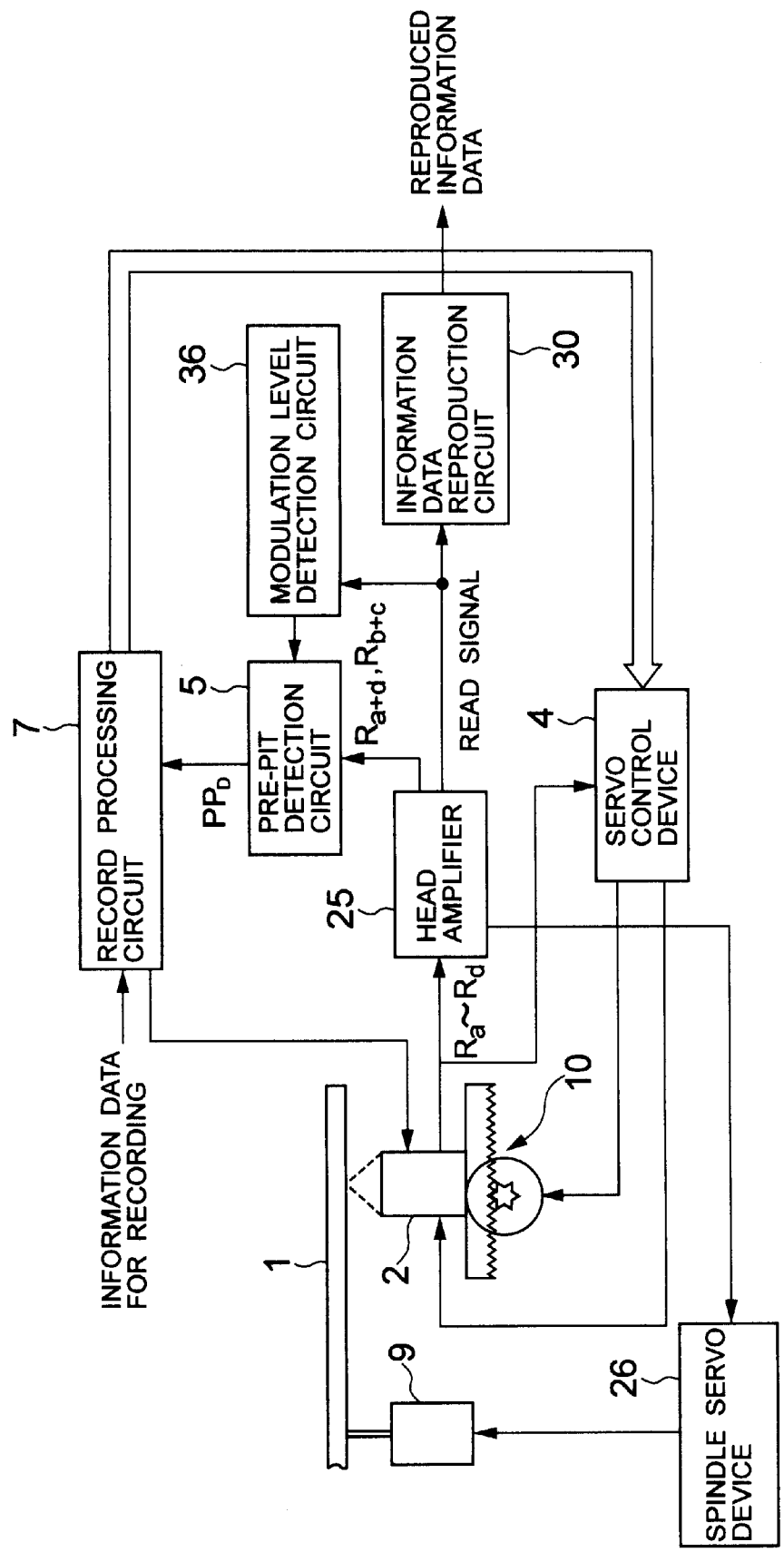

FIG. 5 shows an information recording/reproducing apparatus to which a pre-pit detecting apparatus according to the present invention is applied. In this information recording/reproducing apparatus, a recording/reproducing head 2 is provided with a recording beam light generator (not shown) for recording of information data to a multi-session type or rewritable optical disc 1 having a recording surface as shown in FIG. 2, a reading beam light generator (not shown) for reading recorded information (containing information data) from the optical disc 1 and a four-section optical detector (reference numeral 20 in FIG. 6).

The recording beam light generator and the reading beam light generator are not necessarily provided separately. They may be formed as a single light beam generator which generates a recording light beam for recording and a reading light beam for reading.

Figure 6:
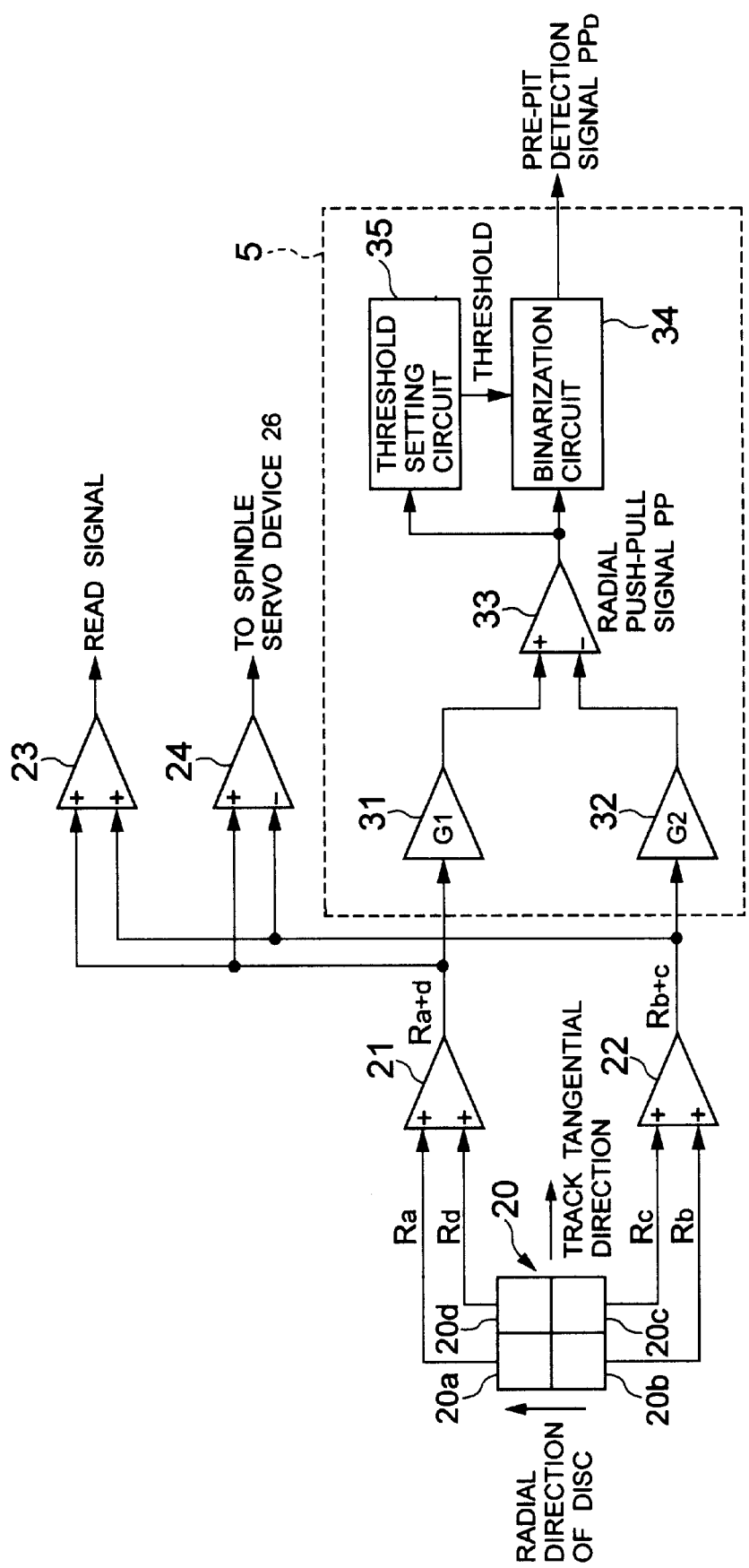
FIG. 6 is a block diagram of the configuration of a pre-pit detection circuit in the apparatus in FIG. 5.

The reading beam light generator illuminates the optical disc 1 rotationally driven by a spindle motor 9 with the reading beam light and forms an information reading spot on its recording surface. A four-section optical detector 20 comprises, as shown in FIG. 6, a photoelectric conversion device having light receiving faces 20a to 20d divided into four sections in the direction along the tangent of the information recording track (groove track 103) on the optical disc 1 and the direction orthogonal to the tangent of the recording track. The photoelectric conversion device receives the light reflected from the optical disc 1 by the information reading spot using each of the four light receiving faces 20a to 20d, individually converts the respective received light into electric signals and outputs them as light receiving signals Ra to Rd.

A servo control device 4 generates a focus error signal, a tracking error signal, and a slider driving signal based on these light receiving signals Ra to Rd. The focus error signal is supplied to the focusing actuator (not shown) incorporated in the recording/reproducing head 2. The focusing actuator adjusts the focus of the information reading spot based on the focus error signal. The tracking error signal is supplied to the tracking actuator (not shown) incorporated in the recording/reproducing head 2. The tracking actuator adjusts the position to form the information reading spot in the radial direction of the disc based on the tracking error signal. The slider driving signal is supplied to the slider 10. The slider 10 moves the recording/reproducing head 2 in the radial direction of the disc at a speed corresponding to the slider driving signal.

The light receiving signals Ra to Rd are supplied to a head amplifier 25 provided with adders 21 to 23 and a subtractor 24. An adder 21 counts the light receiving signals Ra and Rd and adder 22 counts the light receiving signals Rb and Rc. Thus, the adder 21 counts the light receiving signals Ra and Rd obtained by light being received at the light receiving faces 20a and 20d respectively of the four-section optical detector 20 and outputs the sum light receiving signal $R_{a+d}$.

The adder 22 counts the light receiving signals Rb and Rc obtained by light being received at the light receiving faces 20b and 20c respectively of the four-section optical detector 20 and outputs the sum light receiving signal $R_{b+c}$.

The adder 23 totals the output signals $R_{a+d}$ and $R_{b+c}$ from the adders 21 and 22. The output signal from the adder 23 is the read signal, or RF signal, and is supplied to an information data reproduction circuit 30. After binarizing the read signal, the information data reproduction circuit 30 reproduces the information data (video data, sound data and computer data) recorded on the optical disc 1 by executing demodulation, error correction, and various information decoding one by one, then outputs them.

The subtractor 24 subtracts the output signal $R_{b+c}$ of the adder 22 from the output signal $R_{a+d}$ of the adder 21. The output signal of the subtractor 24 becomes the signal showing the frequency caused by wobbling of the groove track 103 and is supplied to a spindle servo device 26 of the spindle motor 9. The spindle servo device 26 rotationally drives the spindle motor 9 so that the frequency obtained from the output signal of the subtractor 24 becomes the frequency corresponding to the predetermined revolution speed. The configuration of the spindle servo device 26 has already been disclosed in Japanese Patent Application Laid-open No. 283638/1998 and an explanation of it is omitted here.

A pre-pit detection circuit 5 detects, based on the output signals from the adders 21 and 22, a land pre-pit (LPP) 104 formed on a land track (Pre-pit track) 102 of the optical disc 1 as shown in FIG. 2 and supplies the pre-pit detection signal $PP_D$ to a record processing circuit 7.

The record processing circuit 7 recognizes, based on the pre-pit detection signal $PP_D$, the position where the recording/reproducing head 2 is currently performing recording, i.e. its position on a groove track 103 and supplies to the servo control device 4 the control signal to make the recording/reproducing head 2 skip tracks from this recording position to the desired recording position. The record processing circuit 7 also generates a record modulation data signal by applying the desired record modulation to the information data to be recorded and supplies it to the recording/reproducing head 2. The recording beam light generator incorporated in the recording/reproducing head 2 generates the recording beam light corresponding to such record modulation data signal and radiates it onto the groove track 103 on the optical disc 1. At that time, the heat is transmitted to the area on the groove track 103 where such recording beam is radiated and an information pit is formed there.

The configuration of the record processing circuit 7 has also already been disclosed in Japanese Patent Application Laid-open No. 283638/1998 and an explanation of it is omitted here.

As shown in FIG. 6, the pre-pit detection circuit 5 comprises an amplifier 31 to amplify the output signal $R_{a+d}$ of the adder 21, an amplifier 32 to amplify the output signal $R_{b+c}$ of the adder 22, a subtractor 33 to subtract the output signal of the amplifier 32 from the output signal of the amplifier 31 and output the result as the radial push-pull signal (groove wobble signal) PP, a binarization circuit 34 which binarizes the push-pull signal PP output from the subtractor 33 using a threshold value to generate the above pre-pit detection signal $PP_D$ and a threshold setting circuit 35 to generate the signal showing the threshold value. The gain G1 of the amplifier 31 is set larger than the gain G2 of the amplifier 32 and G1/G2>1. The gain G1 of the amplifier 31 is, for example, 1.3 and the gain G2 of the amplifier 32 is, for example, 1.

In the pre-pit detection circuit 5 with such a configuration, the gain G1 of the amplifier 31 to amplify the output signal $R_{a+d}$ of the adder 21 is higher than the gain G2 of the amplifier 32 to amplify the output signal $R_{b+c}$ of the adder 22, and the output signal level of the amplifier 31 becomes higher than the output signal level of the amplifier 32 even if the output signal $R_{a+d}$ of the adder 21 and the output signal $R_{b+c}$ of the adder 22 are at the same level when the information reading spot is on the groove track 103 of the recording surface.

The push-pull signal PP output from the subtractor 33 is supplied to the threshold setting circuit 35 in addition to the above binarization circuit 34. The threshold setting circuit 35 calculates a threshold level to obtain the pre-pit detection signal $PP_D$ corresponding to the LPP in the binarization circuit 34 and outputs the threshold signal to show the threshold value. The threshold signal generated by the threshold setting circuit 35 is supplied to the binarization circuit 34.

The output of the adder 23 is sent to a modulation level detection circuit 36. The modulation level detection circuit 36 calculates the modulation level Mod from the amplitude of the RF signal output from the adder 23. The signal showing the modulation level Mod is supplied to a CPU 65 (to be described later) of the threshold setting circuit 35.

Figure 7:
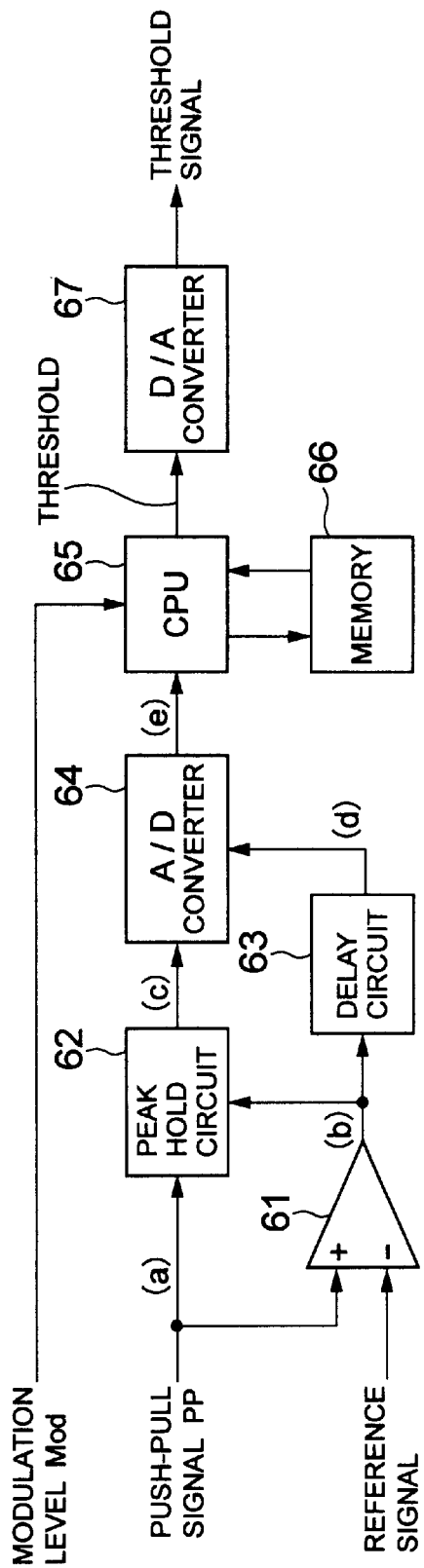
FIG. 7 is a block diagram of the configuration of a threshold setting circuit in the circuit in FIG. 6.

The threshold setting circuit 35 specifically comprises, as shown in FIG. 7, a comparator 61, a peak hold circuit 62, a delay circuit 63, an A/D converter 64, a CPU 65, a memory 66 and a D/A converter 67. The comparator 61 compares the push-pull signal (groove wobble signal) and the reference signal to generate a binary signal. The binary signal output from the comparator 61 is supplied to the peak hold circuit 62 and the delay circuit 63. The peak hold circuit 62 detects the negative peak value of the push-pull signal in the period when the binary signal is 0 and holds the detected value during that period, and clears the peak value it has held when the binary signal is 1. The delay circuit 63 delays the binary signal for a certain time and outputs it as the sampling timing signal for the A/D converter 64. The A/D converter 64 samples the peak hold level held by the peak hold circuit 62 in response to the sampling timing signal and converts it to digital data. The CPU 65 has the memory 66 store the peak hold level data by an operation described later and calculates the slice level using such storage data. The D/A converter 67 converts the slice level calculated by the CPU 65 to an analog signal. The memory 66 is for storing thresholds TH1, TH2, and TH3 (to be described later) in a rewritable form.

Next, the threshold calculation operation of the threshold setting circuit 35 for the optical disc 1 will be explained below using waveform diagrams of various sections and flowcharts. Note that the optical disc 1 used here is an optical disc such as a DVD-RW or DVD-R having the LPP as shown in FIG. 2. In addition, this threshold calculation operation is executed for a recorded area, a not-yet-recorded area, and a embossed area on the optical disc 1.

Figure 8:
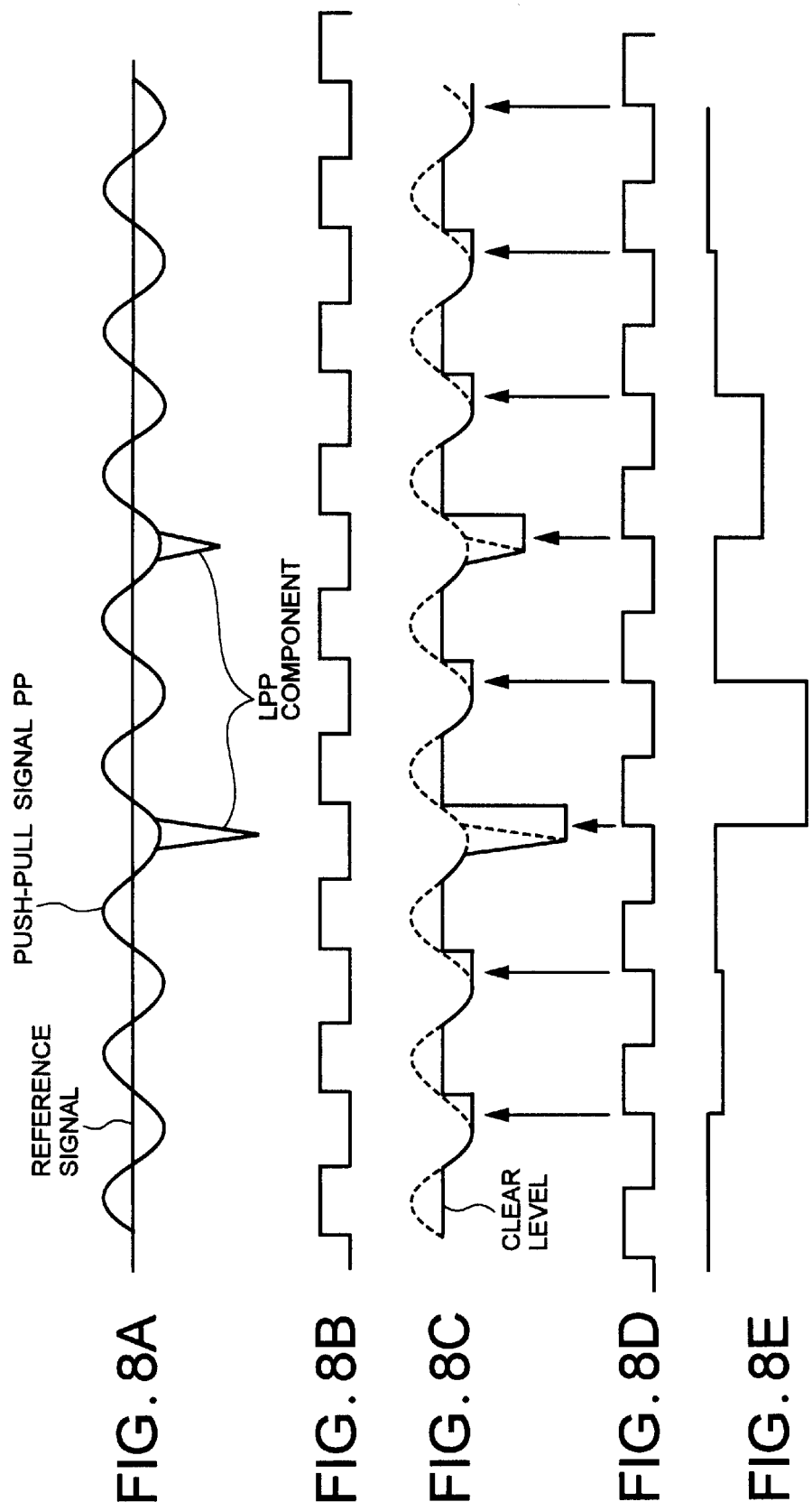
FIGS. 8A to 8E are waveform diagrams showing the operations of various sections in the threshold setting circuit in FIG. 7.

The push-pull signal PP output from the subtractor 33 of the recording/reproducing head 2 is a sine wave as shown in FIG. 8A. (To be precise, it is a waveform very similar to a sine wave, but to make it easy to explain, we call it a sine wave.) It reflects groove 103 wobbled as shown in FIG. 2 for the optical disc 1. In addition, as shown in FIG. 8A, the section corresponding to the LPP in the push-pull signal, i.e. the LPP component, protrudes from the sine waveform to the negative side. The push-pull signal is compared with the reference signal by the comparator 61 and becomes a binary signal with the waveform as shown in FIG. 8B. The binary signal becomes the pulse signal which indicates 1 when the push-pull signal level is higher than the reference signal level and indicates 0 when the push-pull signal level is not higher than the reference signal level. In addition, for the push-pull signal, the peak value of the negative level is detected by the peak hold circuit 62. The peak hold operation starts every time the binary signal rises and the held value is cleared at every rising. Thus, as shown in 8C, the output is at the clear level in the range where the push-pull signal PP is higher than the reference level. While the push-pull signal PP is equal to or less than the reference signal level, the peak value is updated following the level of the push-pull signal until the negative peak of the push-pull signal is reached, but after the negative peak is reached, that negative peak value is maintained. Therefore, the section corresponding to the LPP is detected as the peak value.

The binary signal output from the comparator 61 is delayed by the delay circuit 63 for a time longer than one-fourth but shorter than one-half of the cycle of the push-pull signal PP and becomes as shown in FIG. 8D. In response to the rise of the delayed signal, the A/D converter 64 samples the output value of the peak hold circuit 62 and supplies the digital signal with its value changing as shown in FIG. 8E to the CPU 65.

Figure 9:
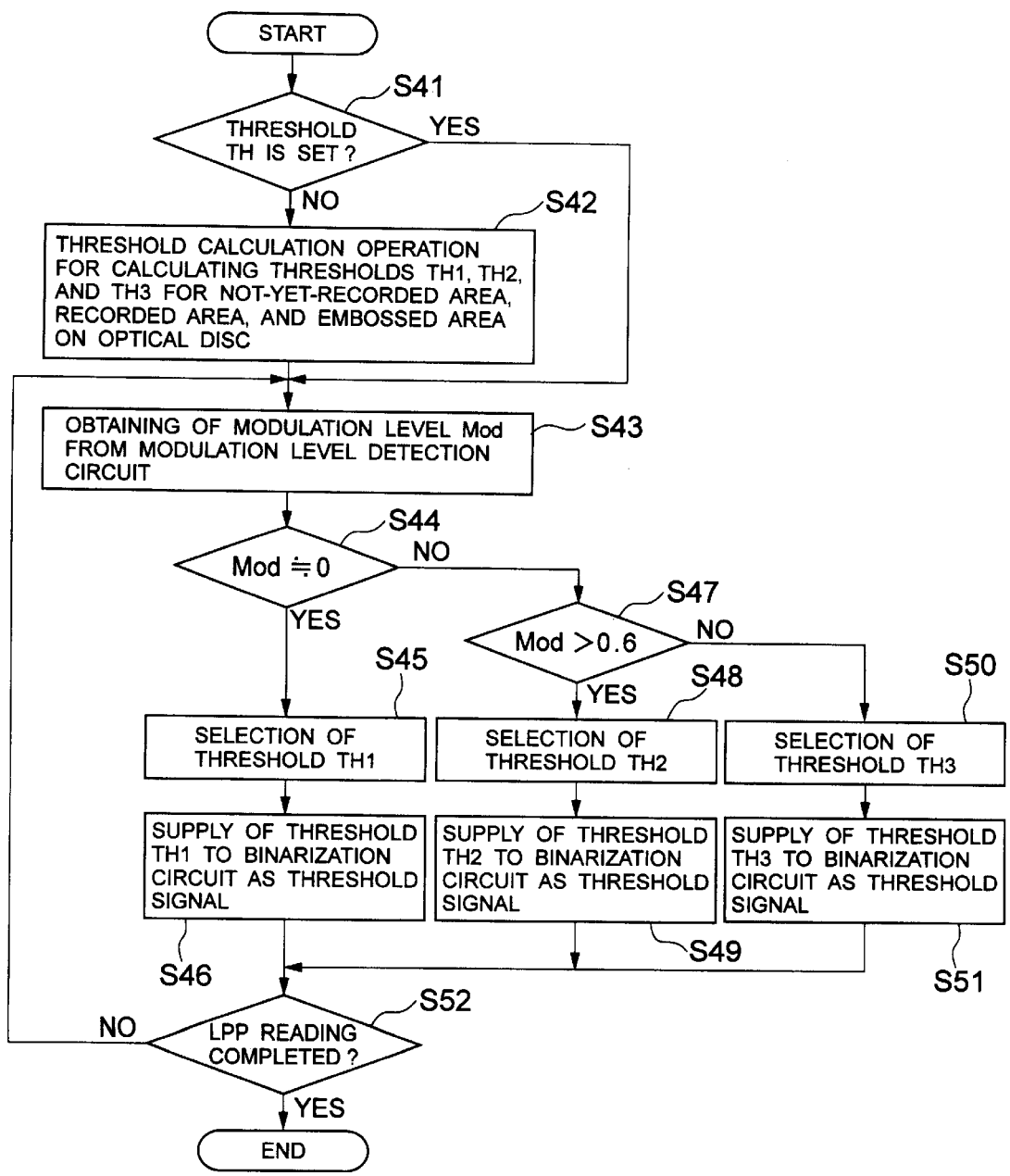
FIG. 9 is a flowchart illustrating a threshold signal generation operation by a CPU in the threshold setting circuit in FIG. 7.

As shown in FIG. 9, when the optical disc 1 is set for recording or reproduction, the CPU 65 judges whether a threshold TH is set or not for that optical disc 1 (Step S41). If the threshold TH is not set, the threshold TH is calculated for the not-yet-recorded area, the recorded area and the embossed area of the optical disc 1 (Step S42). This operation in Step S42 is the threshold calculation operation. The threshold calculation operation is executed for the not-yet-recorded area, the recorded area, and the embossed area of the optical disc 1.

Figure 10:
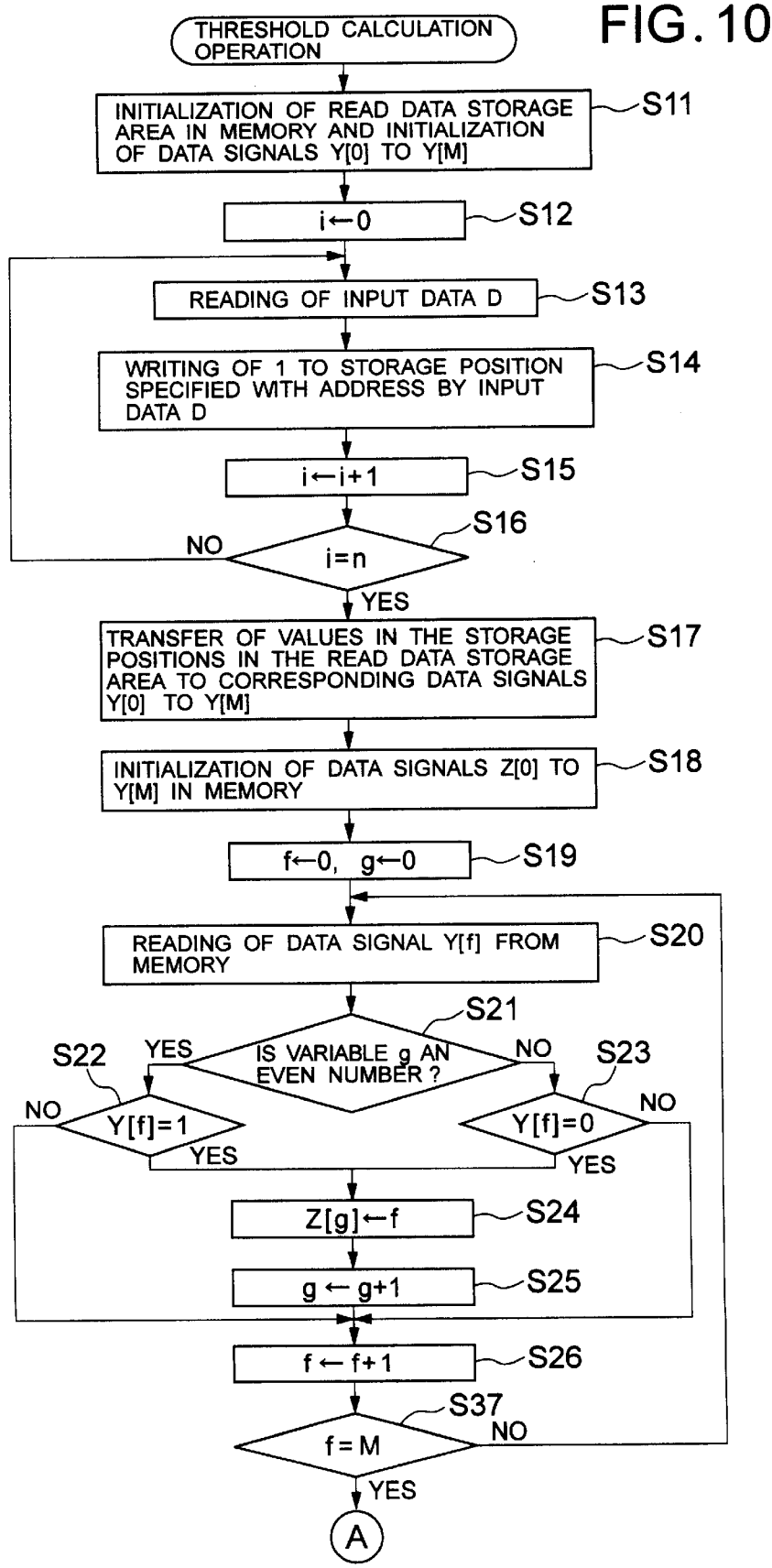
FIG. 10 is a flowchart illustrating a threshold calculation operation by the CPU in the threshold setting circuit in FIG. 7.

When calculating the threshold TH for each area, the CPU 65 first initializes the read data storage area in the memory 66 to 0 and initializes M+1 (M is a positive integer) data signals Y[0] to Y[M] formed in the memory 66 to 0 as shown in FIG. 10 (Step S11), then sets a variable i to 0 (Step S12). The read data storage area is an area for which the output data of the A/D converter 64 is specified as the address and comprises M+1 storage positions. The data signals Y[0] to Y[M] are provided in accordance with the number of resolutions the A/D converter 64 has, which correspond to the storage positions in the read data storage area. The CPU 65 reads the output of the A/D converter 64 as data D in synchronism with the sampling frequency of the A/D converter 64 (Step S13) and writes 1 at the storage position in the read data storage area corresponding to the data D by deeming the data D as the address in the memory 66 (Step S14). It adds 1 to the variable i (Step S15) and judges whether variable i reaches the data taking count n (Step S16). If i<n, control returns to Step S13 and reads the next output of the A/D converter 64 as the data D. If i=n, n pieces of data for a predetermined period have been read, and the CPU 65 transfers the values at the storage positions in the read data storage area to the corresponding the data signals Y[0] to Y[M] (Step S17).

After executing Step S17, the CPU 65 initializes M+1 data signals Z[0] to Z[M] formed in the memory 66 to 0 (Step S18) and sets variables f and g both to 0 (Step S19). The data signals Z[0] to Z[M] are provided in accordance with the number of resolutions the A/D converter 64 has, which correspond to the storage positions in the read data storage area. The CPU 65 reads out a data signal Y[f] from the memory 66 (Step S20) and judges whether the variable g is even or odd (Step S21). If the variable g is even, it judges whether the data signal Y[f] is 1 or not (Step S22). If the variable g is odd, it judges whether the data signal Y[f] is 0 or not (Step S23). If it is found that Y[f]=1 at Step S22 or that Y[f]=0 at Step S23, a data signal Z[g] is made equal to f (Step S24). Then 1 is added to the variable g (Step S25) and 1 is added to the variable f (Step S26). Next, it is judged whether the variable f reaches the fixed the value M (Step S27). If f<M, the control returns to Step S20 and reads out the next data signal Y[f] from the memory 66.

If it is found that Y[f]=0 at Step S22 or that Y[f]=1 at Step S23, control immediately goes to Step S26. By the operation from Step S19 to Step S27, the values of f when the data signal Y[f] changes from 0 to 1 and from 1 to 0 are written sequentially to a data signal Z[g].

Figure 11:
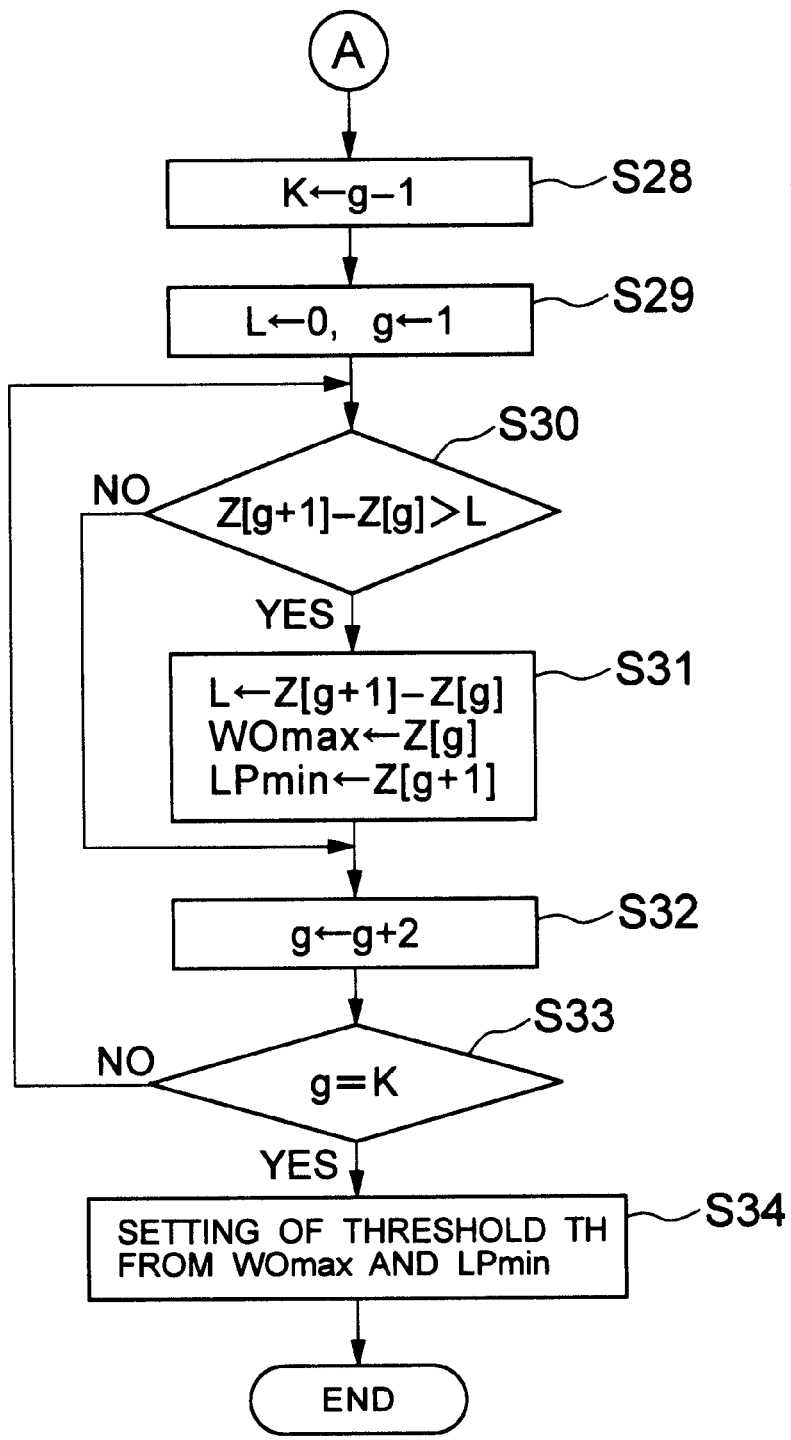
FIG. 11 is a flowchart illustrating a continued section of the threshold calculation operation in FIG. 10.

If f=M at Step S27, the value obtained by subtracting 1 from the variable g is K (Step S28), as shown in FIG. 11. The value of K is the value of g for the final value setting to the data signal Z[g] at Step S24.

Next, the CPU 65 sets a variable L to 0 and sets the variable g to 1 (Step S29). It judges whether Z[g+1]−Z[g] is larger than the variable L or not (Step S30). Z[g+1]−Z[g] is Z[even number]−Z[odd number], and this shows the length of the area where 0 continues. If Z[g+1]−Z[g]>L, the CPU 65 sets the variable L as Z[g+1]−Z[g], sets the maximum value WOmax of the wobbling groove section to Z[g] and the minimum value LPmin of the LPP section to Z[g+1] (Step S31). Then it adds 2 to the variable g (Step S32) and judges whether the variable g is equal to K (Step S33). If g<K, the control returns to Step S30 and judges whether Z[g+1]−Z[g]>L using a new Z[even number] and Z[odd number] obtained by Step S32.

If [g+1]−Z[g]≦L at Step S30, control immediately goes to Step S32.

If g=K at Step S33, the threshold TH is calculated using the maximum value WOmax of the wobbling groove section and the minimum value LPmin of the LPP section (Step S34).

Figure 12:
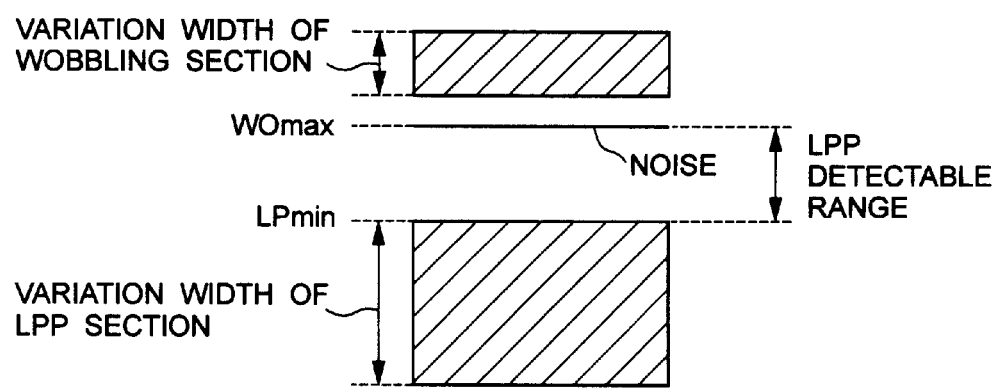
FIG. 12 is a diagram of level distribution of the push-pull signal PP.

FIG. 12 shows an example of level distribution indicated by the data signals Y[0] to Y[M] sampled. In this distribution, noise is contained at the level separated from the fluctuation width of the wobbling groove section in the push-pull signal PP and the fluctuation width of the LPP section in the push-pull signal. In the area between this noise level and the minimum value LPmin of the fluctuation width of the LPP section, the area where 0 continues has the maximum length and the noise level is the maximum value WOmax of the wobbling groove section. Between the minimum value LPmin of the fluctuation width of the LPP section and the maximum value WOmax is the range where LPP can be detected. The threshold value TH is set within this range.

The threshold value TH can be calculated in Step S34 by one of the three methods below.
(1) Add a certain offset value ΔV1 to the maximum value WOmax of the wobbling groove section (TH=WOmax−ΔV1),
(2) Subtract a certain offset value ΔV2 from the minimum value LPmin of the fluctuation width of the LPP section (TH=LPmin−ΔV2)
(3) Calculate the average of the maximum value WOmax of the wobbling groove section and the minimum value LPmin of the variation width of the LPP section (TH=WOmax+LPmin)/2)

Note that the offset values ΔV1 and ΔV2 are largest in the not-yet-recorded area on the optical disc 1, become smaller in the embossed area, and even smaller in the recorded area.

Figure 13:
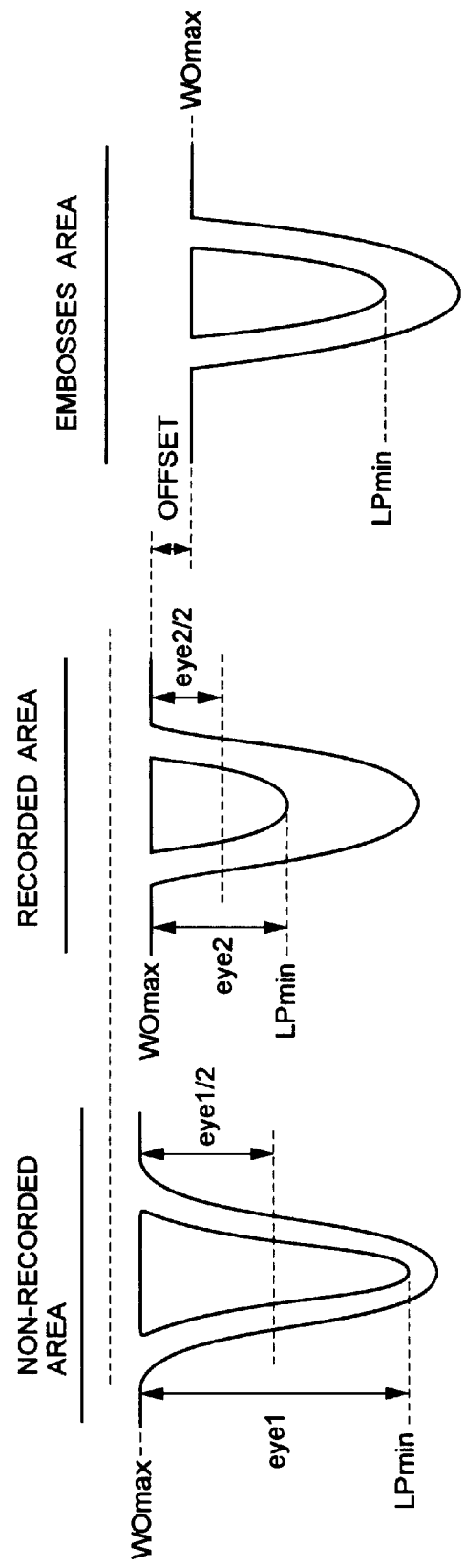
FIGS. 13A to 13C are overlaid waveform diagrams of push-pull signals containing LPP components for a not-yet-recorded area, a recorded area and an embossed area.

A overlaid waveform formed by overlaying the push-pull signals PP corresponding to the LPPs in the not-yet-recorded area on the optical disc 1 is as shown in FIG. 13A. On the other hand, the overlaid waveform of the push-pull signals PP corresponding to the LPPs in the recorded area on the optical disc 1 is as shown in FIG. 13B. As understood from FIGS. 13A and 13B, the difference eye1 between the minimum value LPmin of the LPP section and the maximum value WOmax of the wobbling groove section in the not-yet-recorded area is larger than their difference eye2 in the recorded area, resulting in a larger range of binarizability. Suppose for example that the middle value eye1/2 in the not-yet-recorded area is adopted as the threshold TH1 and also as the threshold TH2 for the recorded area. It then becomes difficult to detect LPP in the recorded area. On the contrary, if the middle value eye2/2 in the recorded area is adopted as the threshold TH2 and also as the threshold TH1 for the not-yet-recorded area, a large range of binarizability in the not-yet-recorded area cannot be utilized sufficiently. Therefore, it is necessary to set the threshold individually for the not-yet-recorded area and the recorded area.

The overlaid waveform of the LPP section in the push-pull signal PP within the embossed area on the optical disc 1 is as shown in FIG. 13C. In other words, a level change in the maximum value WOmax in the wobbling groove section results in offset and the same threshold cannot be set. Thus, it becomes necessary to set the threshold individually for the embossed area and the data area.

The CPU 65, after executing Step S42, obtains the modulation level Mod from the modulation level detection circuit 36 to investigate the current reading position of the recording/reproducing head 2 on the optical disc 1 (Step S43). Step 43 is executed immediately if it is judged at Step S41 that the threshold TH is set.

Figure 14:
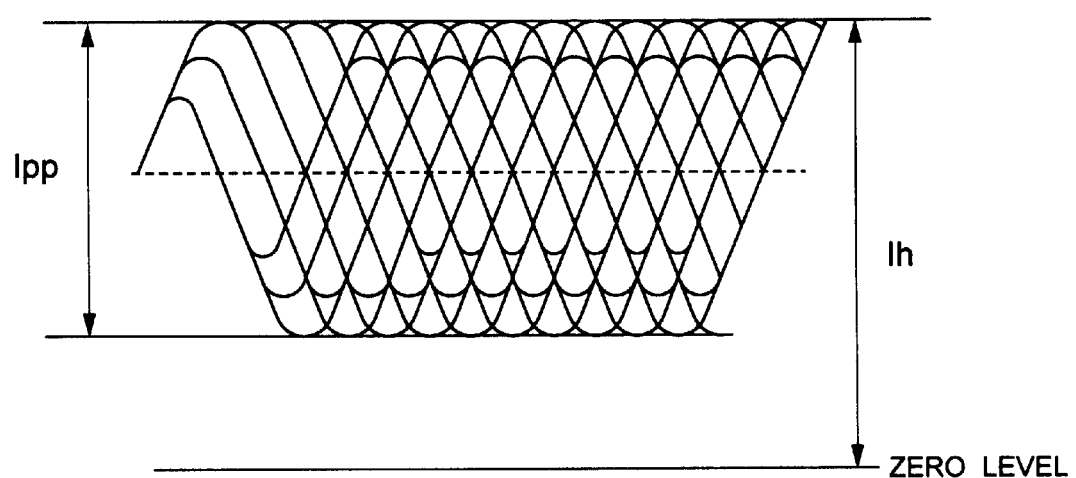
FIG. 14 is a waveform diagram of the RF signal for explaining a modulation level calculation method.

The modulation level detection circuit 36 calculates the modulation level Mod from the currently detected RF signal. The modulation level Mod is calculated from Mod=Ipp/Ih using the peak-to-peak level Ipp of the amplitude for the RF signal and the maximum value Ih from zero level. When the RF signal has the amplitude waveform shown in FIG. 14, the peak-to-peak level Ipp and the maximum value Ih are as shown in FIG. 14.

When the modulation level Mod is obtained, the CPU 65 judges whether modulation level Mod is substantially 0 or not (Step S44). If Mod is almost 0, the current reading position of the recording/reproducing head 2 is considered to be in the not-yet-recorded area and the threshold TH1 is selected (Step S45). The analog signal representing the threshold TH1 is supplied to the binarization circuit 34 via the D/A converter 67 (Step S46). If Mod is not substantially 0, it is judged whether the modulation level Mod is larger than 0.6 or not (Step S47). If Mod>0.6, the current reading position of the recording/reproducing head 2 is considered to be in the recorded area. In this case, the threshold TH2 is selected (Step S48) and the analog signal representing the threshold TH2 is supplied to the binarization circuit 34 via the D/A converter 67 (Step S49). If Mod≦0.6, the current reading position of the recording/reproducing head 2 is considered to be in the embossed area, the threshold TH3 is selected (Step S50) and the analog signal representing the threshold TH3 is supplied to the binarization circuit 34 via the D/A converter 67 (Step S51).

Thus, the binarization circuit 34 uses the threshold corresponding to the area where the reading position of the disc 1 is currently positioned to detect LPP. The binarization circuit 34 supplies the pre-pit detection signal $PP_D$, which indicates detection of an LPP, to the record processing circuit 7 and the record processing circuit 7 judges the address and other information on the optical disc 1 corresponding to the pre-pit detection signal $PP_D$.

The CPU 65 repeats the operation from Step S43 to Step S51 above until LPP reading is completed (Step S52).

Figure 15:
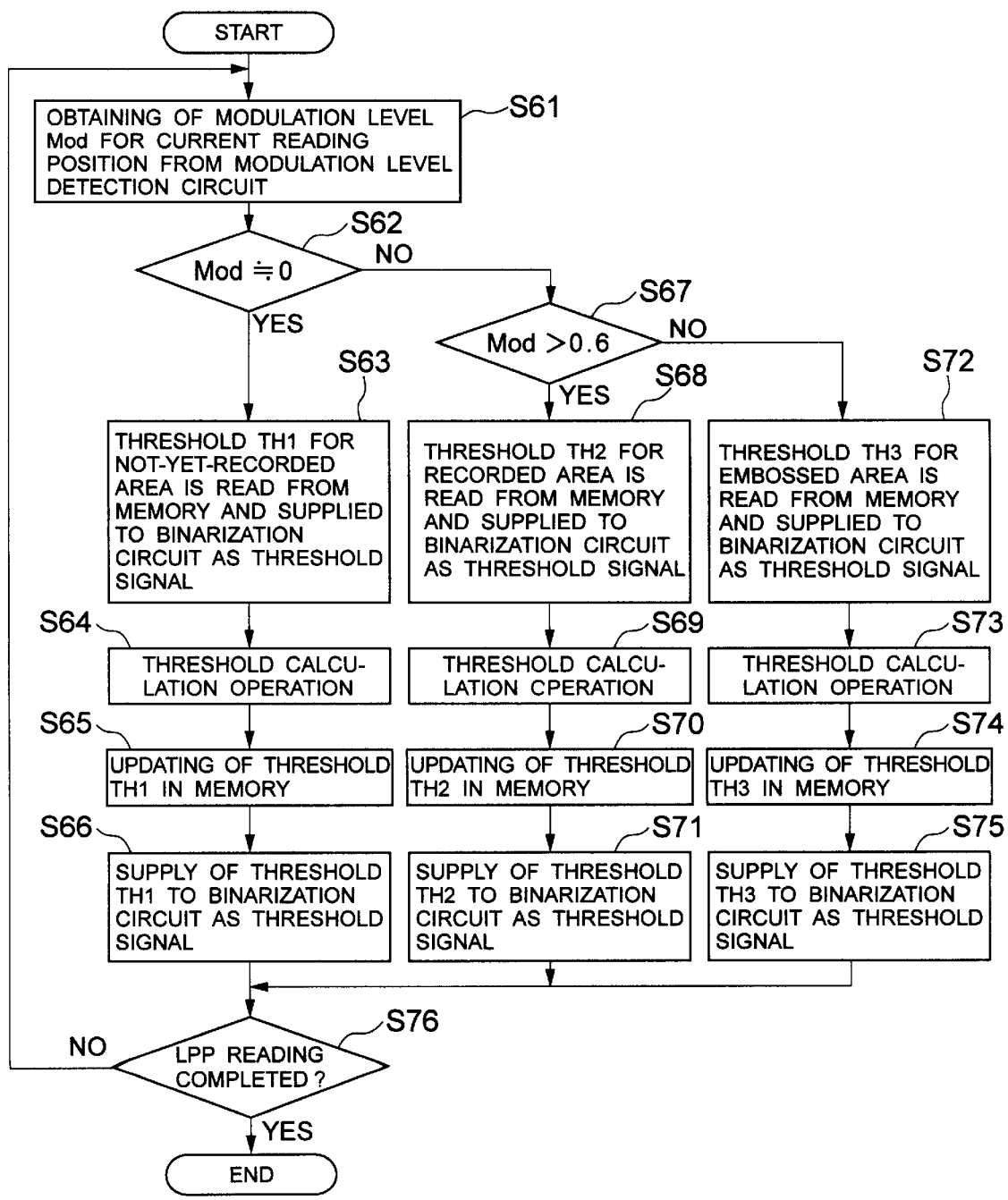
FIG. 15 is a flowchart illustrating another threshold signal generation operation by the CPU in the threshold setting circuit in FIG. 7.

In the above example the thresholds TH1, TH2, and TH3 for each area of the optical disc 1 are set in advance and then the LPP is read, but the threshold for the reading area may be updated as required during execution of LPP reading on the optical disc 1, as shown in FIG. 15.

Referring to FIG. 15, the CPU 65 obtains the modulation level Mod from the modulation level detection circuit 36 to judge the current reading position of the recording/reproducing head 2 on the optical disc 1 (Step S61). The modulation level Mod is, as described above, calculated from Mod=Ipp/Ih using the peak-to-peak level Ipp of the amplitude for the RF signal and the maximum value Ih from zero level.

When the modulation level Mod is obtained, the CPU 65 judges whether its modulation level Mod is substantially 0 or not (Step S62). If Mod is almost 0, the current reading position of the recording/reproducing head 2 is considered to be in the not-yet-recorded area and the threshold TH1 for the not-yet-recorded area stored in the memory 66 is read out. The analog signal representing the read out threshold TH1 is supplied to the binarization circuit 34 via the D/A converter 67 (Step S63). Then the above threshold calculation operation is executed (Step S64) and the resulting threshold TH is set as the threshold TH1 to update TH1 in the memory 66 (Step S65). Next, via the D/A converter 67, the analog signal representing the newest threshold TH1 is supplied to the binarization circuit 34 (Step S66). If Mod is not substantially 0, it is judged whether the modulation level Mod is larger than 0.6 or not (Step S67). If Mod>0.6, the current reading position of the recording/reproducing head 2 is considered to be in the recorded area. In this case, the threshold TH2 for the recorded area stored in the memory 66 is read out and, via the D/A converter 67, the analog signal representing the read out threshold TH2 is supplied to the binarization circuit 34 (Step S68). The above threshold calculation operation is then executed (Step S69) and the resulting threshold TH is set as the threshold TH2 and TH2 in the memory 66 is updated (Step S70). Next, via the D/A converter 67, the analog signal representing the newest threshold TH2 is supplied to the binarization circuit 34 (Step S71). If Mod≦0.6, the current reading position of the recording/reproducing head 2 is considered to be in the embossed area, the threshold TH3 for the embossed area stored in the memory 66 is read out and the analog signal representing the read out threshold TH3 is supplied to the binarization circuit 34 via the D/A converter 67 (Step S72). The above threshold calculation operation is executed (Step S73) and the resulting threshold TH is set as the threshold TH3 and TH3 in the memory 66 is updated (Step S74). Next, via the D/A converter 67, the analog signal representing the newest threshold TH3 is supplied to the binarization circuit 34 (Step S75).

The CPU 65 repeats the operation from Step S61 to Step S75 above until LPP reading is completed (Step S76).

Figure 16:
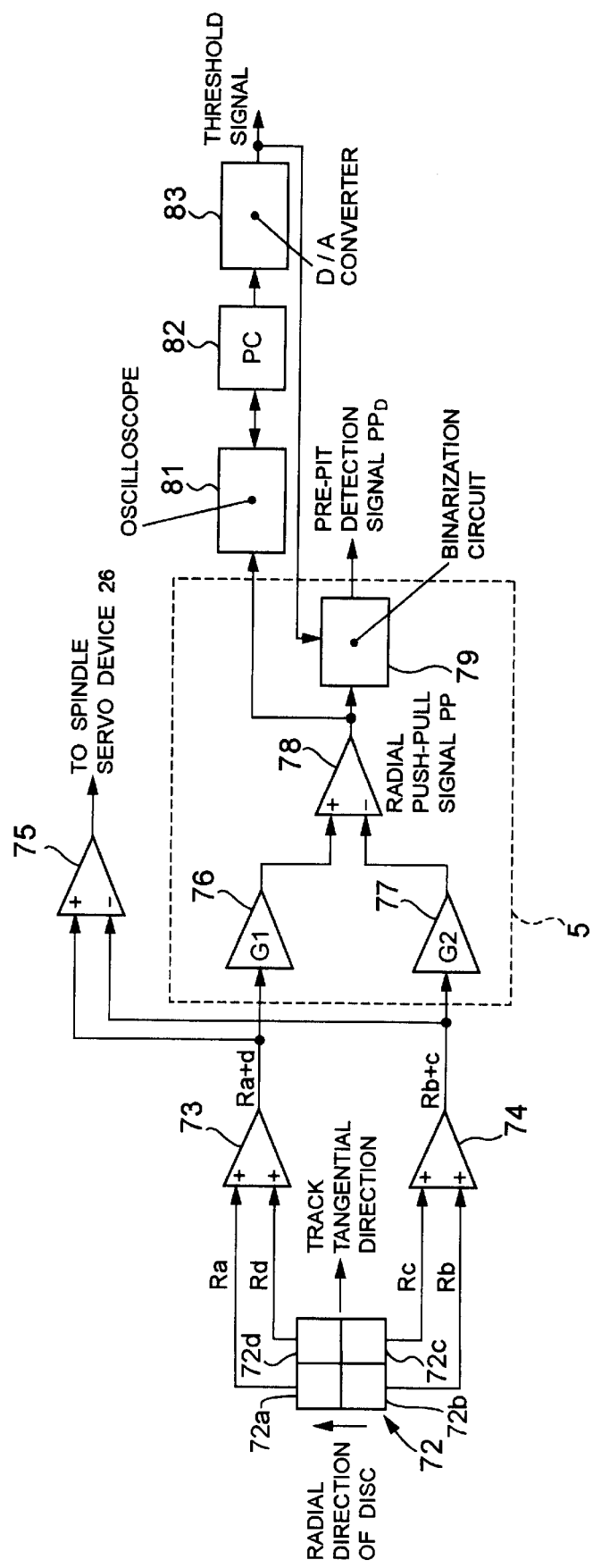
FIG. 16 is a block diagram of a part of the configuration of a disc inspection device as another embodiment of the present invention.

FIG. 16 shows an optical disc inspection device as another embodiment of the present invention. This optical disc inspection device is a device to inspect the extent of errors in the addresses and other information obtained from the LPP's on an optical disc having LPP. Just like ordinary recorded data, the LPP is also provided with parity for error correction. When LPP read data contains errors above the correction capacity with error correction by parity, the disc is judged defective. In other words, in the optical disc inspection device, the error rate is measured for every block, which is a lump of data, as a unit of error correction processing.

Such an optical disc inspection device is provided, as shown in FIG. 16, with a four-section optical detector 72 of a reproduction head 71, adders 73 and 74, subtractors 75 and 78, amplifiers 76 and 77, and a binarization circuit 79 and they are the same as the four-section optical detector 20, the adders 21 and 22, the subtractors 24 and 33, the amplifiers 31 and 32 and the binarization circuit 34 shown in FIG. 6. In addition, the optical disc inspection device is also provided with the configuration of a player shown in FIG. 5. Note that the light receiving areas 72a to 72d of the four-section optical detector 72 are adjusted for appropriate gains in advance so that their output signals have the same RF signal component level.

The push-pull signal PP output from the subtractor 78 is supplied to an oscilloscope 81. The oscilloscope 81 samples the push-pull signal PP and, for example, displays the section corresponding to the LPP in the push-pull signal PP.

The oscilloscope 81 is connected to a personal computer (PC) 82. The PC 82 calculates the threshold value by an operation described later using the level data of the push-pull signal PP stored in the internal memory (a sample memory 93 to be described later, for example) of the oscilloscope 81. The PC 82 is connected to a D/A converter 83, The D/A converter 83 converts the slice level calculated by the PC 82 into an analog signal. The output signal from the D/A converter 83 is supplied as the threshold signal for binarization to the binarization circuit 79.

The connection of the PC 82 with the oscilloscope 81 and the D/A converter 83 is based on certain interface standards like GPIB, 10BASE-T or RS-232C, for example.

The signal output from the binarization circuit 79 (Pre-pit detection signal $PP_D$) is supplied to an error rate detection circuit (not shown) and the error rate corresponding to the supplied signal is detected there.

Figure 17:
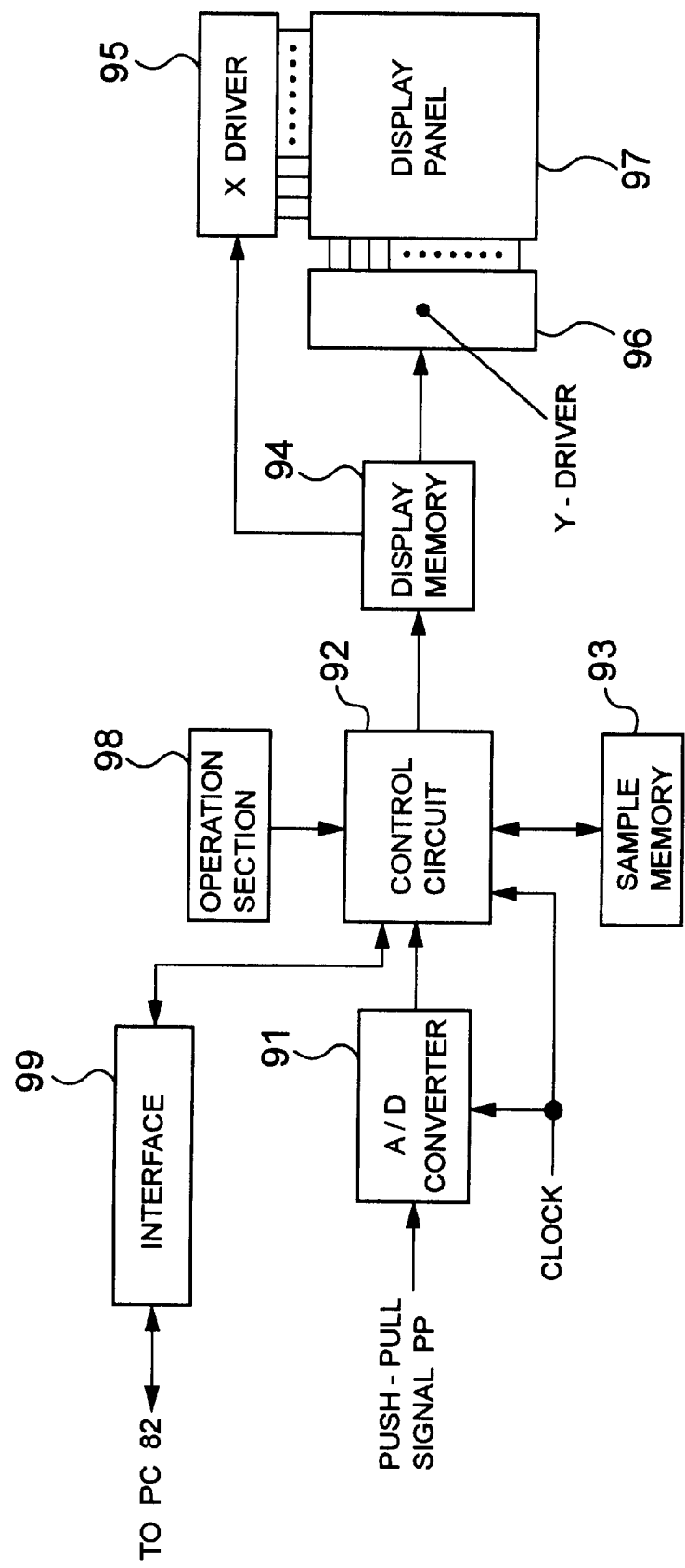
FIG. 17 is a block diagram of a configuration example of an oscilloscope in the device in FIG. 16.

The oscilloscope 81 may have, for example, the configuration as shown in FIG. 17. Specifically, the oscilloscope 81 comprises an A/D converter 91, a control circuit 92, a sample memory 93, a display memory 94, X and Y drivers 95 and 96, a display panel 97, an operation section 98, and an interface 99. The A/D converter 91 converts the input analog signal to a digital signal. The control circuit 92 sequentially writes the sample data of the digital signal obtained by the A/D converter 91 to the sample memory 93, reads out the data to be displayed from the sample memory 93, and writes the data to the display memory 94 for development. The X and Y drivers 95 and 96 drive the display panel 97 corresponding to the data written to the display memory 94 and have the display panel 97 display the waveform of the input analog signal. The interface 99 is a circuit based on GPIB, 10BASE-T, RS-232C or some other interface standard for connection with the PC 82 as described above and transfers the data written to the sample memory 93 to the PC via the control circuit 92. In addition, the interface 99 relays and supplies the instructions from the PC to the control circuit 92.

In the optical disc inspection device with such a configuration, the push-pull signal PP output from the subtractor 78 is supplied to the oscilloscope 81 for a certain inspection period, and at the oscilloscope 81, the push-pull signal PP is sampled by the A/D converter 91 according to the high frequency clock, and the control circuit 92 sequentially stores such sampling data in the memory 93. In addition to data storage to the memory 93, the control circuit 92 can also read out the data and supply the data to the display memory 94 so that the waveform is displayed on the display panel 97. The lead-out timing may be, for example, set corresponding to the instruction from the operation section 98 and thus, the waveform of the LPP section, which indicates the address, can be displayed.

By giving instructions to the control circuit 92 of the oscilloscope 81 via the interface 99, the PC 82 can read out and fetch the sample data stored in the sample memory 93.

The PC 82 calculates the threshold TH by the threshold calculation operation as shown in FIGS. 10 and 11. Note that the storage area and data signals formed in the memory 66 in FIGS. 10 and 11 during the threshold calculation operation by the PC 82 are formed in the internal memory (not shown) of the PC 82.

Figure 18:
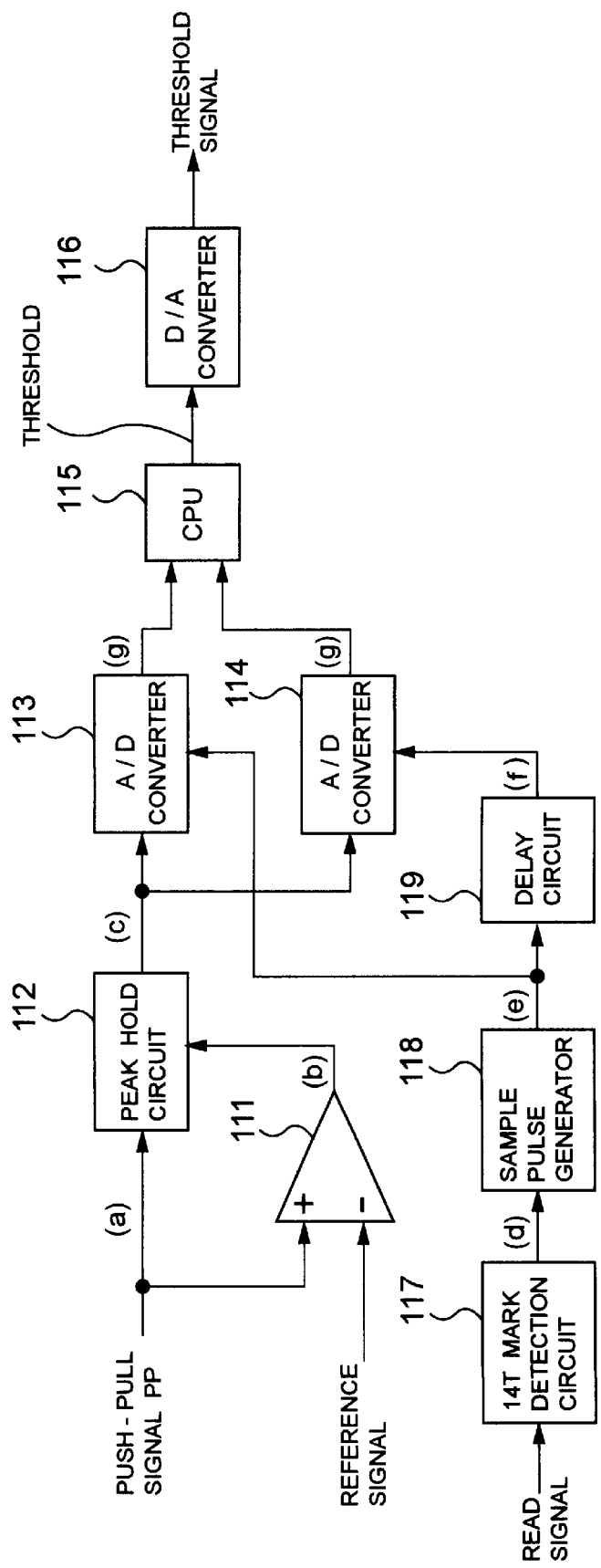
FIG. 18 is a block diagram of another configuration of the threshold setting circuit in the circuit in FIG. 6.

FIG. 18 shows, as another embodiment of the present invention, another configuration example of the threshold setting circuit 35. The threshold setting circuit 35 in FIG. 18 comprises a comparator 111, a peak hold circuit 112, A/D converters 113 and 114, a CPU 115, a D/A converter 116, a 14T mark detection circuit 117, a sample pulse generator 118, and a delay circuit 119. The comparator 111 compares the push-pull signal (groove wobble signal) and the reference signal to generate a binary signal. The output binary signal from the comparator 111 is supplied to the peak hold circuit 112. The peak hold circuit 112 detects the negative peak value of the push-pull signal in the period when the binary signal is 0 and holds it during such period, and clears the peak value it has held when the binary signal is 1. Two A/D converters 113 and 114 are connected to the output of the peak hold circuit 112. The A/D converters 113 and 114 sample the peak hold level held by the peak hold circuit 112 in response to different sampling timing signals, convert the sampled data into digital data, and supply the digital data to the CPU 115.

Figure 4:
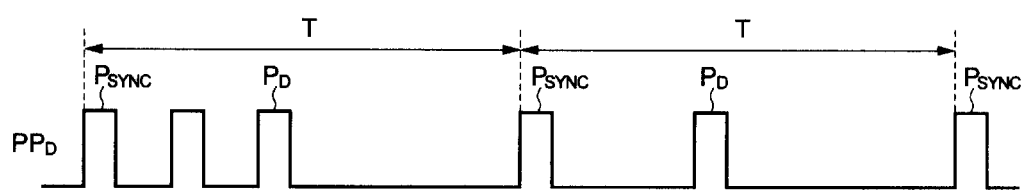
FIG. 4 is a diagram of a waveform of a pre-pit detection signal.
Figure 19:
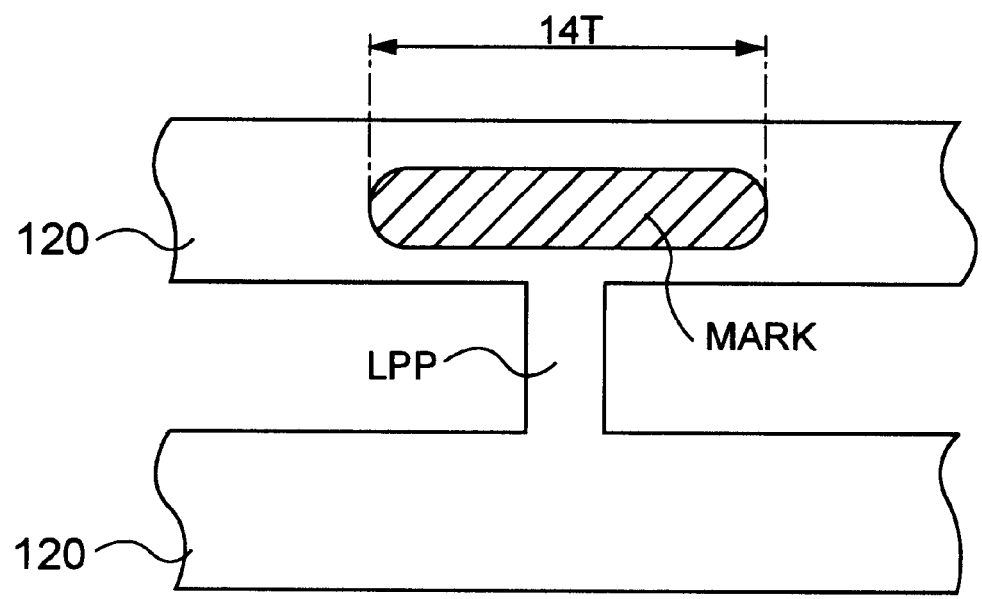
FIG. 19 is a diagram showing the relation between the LPP position and the 14T sync signal mark position.

The 14T mark detection circuit 117, the sample pulse generator 118, and the delay circuit 119 are provided to generate the sampling timing signal for the A/D converters 113 and 114. The read signal that is the output signal from the adder 23 in FIG. 6 is supplied to the 14T mark detection circuit 117. The 14T mark detection circuit 17 detects any mark with a length of 14T (T is the bit interval) from the read signal. A mark represents a section with a different reflection ratio (including a bit) formed on the groove track 113 to carry information including a sync signal as shown in FIG. 2. The 14T mark indicates the sync signal positioned at the beginning of each frame and has the longest length among the marks recorded on the optical disc 1. LPPs exist in either odd or even frames and, as shown in FIG. 19, the first bit position of the LPP in the groove track 120 coincides with the mark position of the 14T sync signal. The length consisting of an odd frame and an even frame corresponds to the cycle t shown in FIG. 4. When the 14T mark detection circuit 117 detects a mark with a length of 14T from the read signal, it generates the 14T detection pulse and supplies it to the sample pulse generator 118.

The sample pulse generator 118 generates the first sample pulse for the A/D converter 113 corresponding to the tail edge of the 14T detection pulse. The delay circuit 119 delays the first sample pulse for the time corresponding to 186T×3 to generate the second sample pulse for the A/D converter 114. 186T×3 corresponds to the distance from the first LPP position corresponding to the sync pulse $P_{SYNC}$ in FIG. 4 to the position without any LPP.

The CPU 115 calculates the slice level by an operation described later corresponding to the digital data output from the A/D converters 113 and 114. The D/A converter 116 converts the slice level calculated by the CPU 115 to an analog signal.

Figure 20:
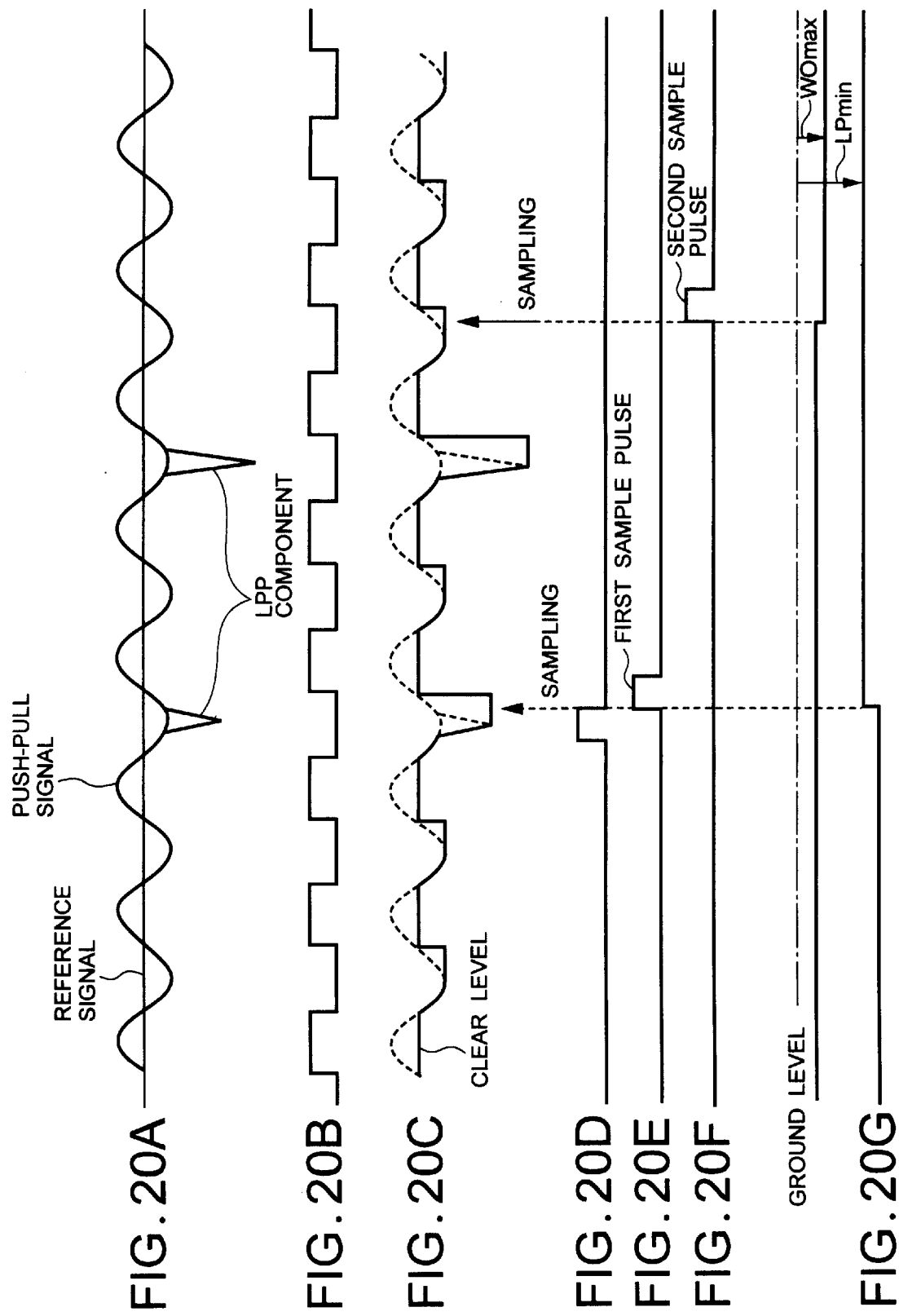
FIGS. 20A to 20G are waveform diagrams showing the operation of the sections in the threshold setting circuit in FIG. 18.

The operation of the threshold setting circuit 35 in FIG. 18 with such a configuration will be explained below. When the push-pull signal PP output from the subtractor 33 of the recording/reproducing head 2 has a waveform as shown in FIG. 20A, that push-pull signal is compared with the reference signal by the comparator 111 and becomes the binary signal with a waveform shown in FIG. 20B. The binary signal becomes the pulse signal which indicates "1" when the pushpull signal level is larger than the reference signal level and "0" when the push-pull signal level is equal to or lower than the reference signal level. In addition, for the push-pull signal, the peak value of the negative level is detected by the peak hold circuit 62 as shown in FIG. 20C. The signal waveforms of FIGS. 20A to 20C are similar to those in FIGS. 8A to 8C.

On the other hand, when a mark with a length of 14T corresponding to the sync signal is detected from the read signal, the 14T mark detection circuit 117 generates the 14T detection pulse as shown in FIG. 20D. As described above, a mark with a length of 14T indicates the sync signal positioned at the beginning of each frame and has the longest length among the marks recorded on the optical disc 1. LPPs exist in either odd or even frames, and the first bit position of the LPP coincides with the mark position of the 14T sync signal. For this reason, the generation of a 14T detection pulse can possibly mean the detection of the first bit of an LPP. The push-pull signal corresponding to the LPP section has a large amplitude as shown in FIG. 20C, but when the mark is at the same position as the LPP, the amplitude of the push-pull signal becomes smaller under the influence of that mark. It becomes smaller as the mark length becomes longer. Thus, when the first bit position of an LPP and the mark position of the sync signal for the maximum length 14T coincide, the amplitude of the push-pull signal becomes the smallest. When an LPP does not exist and there is a 14T mark only, the push-pull signal corresponds to the maximum value WOmax of the wobbling groove section.

The sample pulse generator 118 generates the first sample pulse so that it rises corresponding to the tail edge of the 14T detection pulse as shown in FIG. 20E. With a delay time corresponding to 186T×3 from the time when the first sample pulse is generated, the delay circuit 119 generates the second sample pulse as shown in FIG. 20F.

In response to the first sample pulse, the A/D converter 113 samples the peak hold level held by the peak hold circuit 112 and converts the obtained data to a digital value. The digital value (data D1) output by the A/D converter 113 is the peak hold level (minimum value of LPP component LPmin) of the push-pull signal when the first bit position of the LPP coincides with the mark position of the sync signal for the maximum length 14T, or the peak hold level (maximum value WOmax) of the push-pull signal when an LPP does not exist and there is a 14T mark only. In response to the second sample pulse, the A/D converter 114 samples the peak hold level held by the peak hold circuit 112 and converts the obtained data to a digital value. The digital value (data D2) output by the A/D converter 114 is the peak hold level (maximum value WOmax) of the push-pull signal when an LPP does not exist and there is a 14T mark only. Therefore, when the digital value output from the A/D converter 113 and the digital value output from the A/D converter 114 are very different, the digital value output from the A/D converter 113 indicates the minimum value LP min of the LPP component. FIG. 20G is an analog representation of sampling of the minimum value LPmin by the A/D converter 113 and sampling of the maximum value WOmax by the A/D converter 114.

Figure 21:
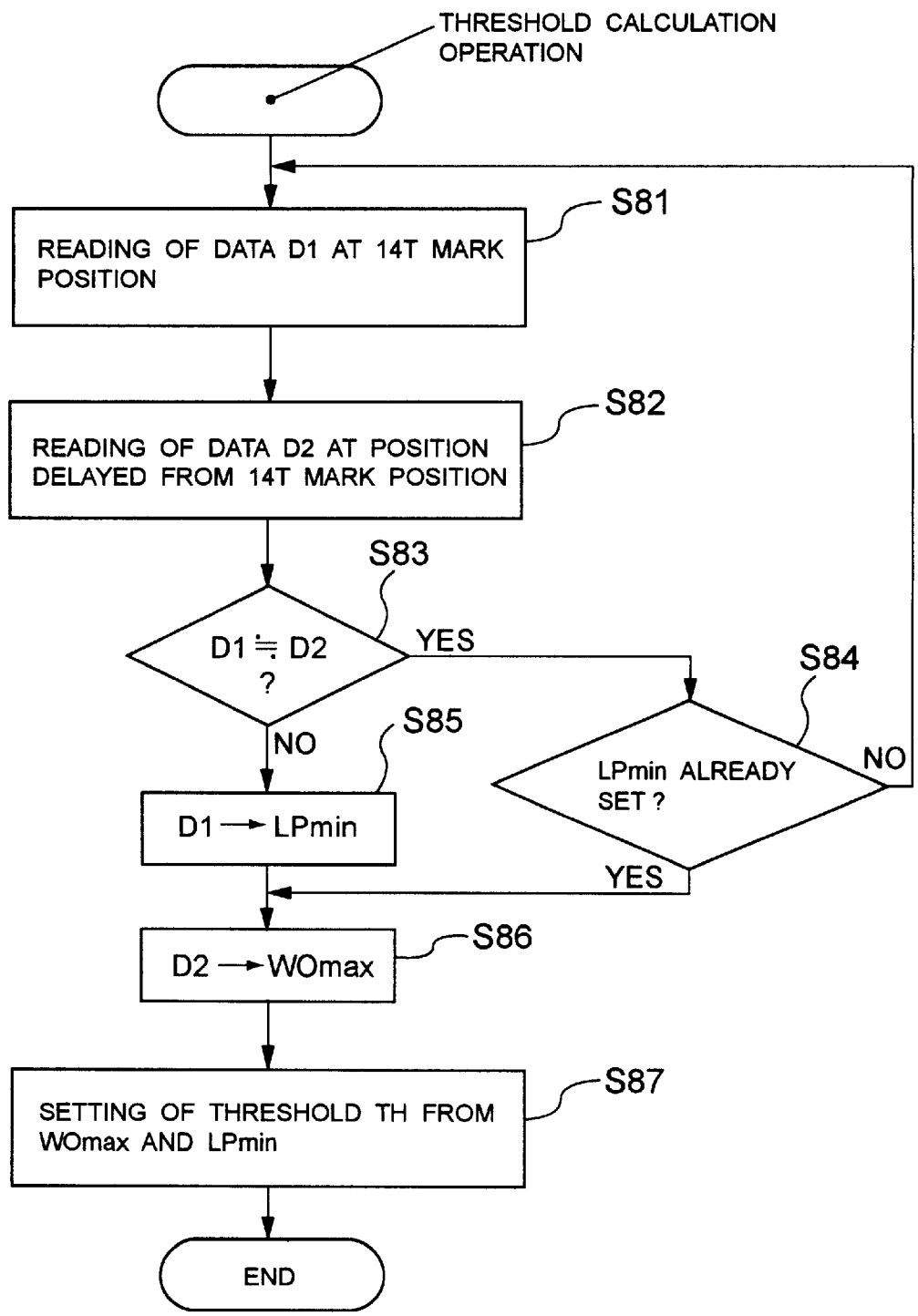
FIG. 21 is a flowchart illustrating the threshold calculation operation by the CPU in the threshold setting circuit in FIG. 18.

As shown in FIG. 21, the CPU 115 reads the digital value output by the A/D converter 113 as the data DI (Step S81) and reads the digital value output by the A/D converter 114 as the data D2 (Step S82). The data D1 and D2 are compared and it is judged whether they are almost the same or not (Step S83). When D1 is substantially equal to D2, it is deemed that the sampling timing this time does not correspond to a frame where the first bit position of an LPP coincides with the mark position of the sync signal for the maximum length 14T. In the case, it is judged whether the minimum value LPmin is already set or not (step S84). If the minimum value LPmin is not yet set, control goes back to Step S81 and repeats steps S81 to S83.

If D1≠D2 according to the judgement at Step S83, it is deemed that the sampling timing this time corresponds to a frame where the first bit position of an LPP coincides with the mark position of the sync signal for the maximum length 14T. In the case, the data D1 is set as the minimum value LPmin for the LPP section (Step S85) and the data D2 is set as the maximum value WOmax of the wobbling groove section (step S86). Using the maximum value WOmax and the minimum value LPmin set above, the threshold value TH is calculated (Step S87). Step S87 has the same contents as the calculation of the threshold value TH in Step S34 above and one of three calculation methods (TH=WOmax+$\Delta$V1, TH=LPmin−$\Delta$V2, TH=(WOmax+LPmin)/2) can be selected for use.

If the minimum value LPmin has not already been set in Step S84, the data D2 newly obtained when the CPU 115 proceeds to Step S86 is set as the maximum value WOmax of the wobbling groove section. In addition, the threshold calculation operation by the CPU 115 is executed for a predetermined period.

Thus, the threshold TH set by the threshold calculation operation by the CPU 115 is supplied to the D/A converter 116 and becomes the analog threshold signal there, and is supplied to the binarization circuit 34.

As described above, according to the present invention, the threshold setting for the push-pull signal in order to detect the pre-pit can be performed appropriately.

This application is based on Japanese Patent Applications No. 2001-30107 and No. 2001-390463 which are hereby incorporated by reference.

What is claimed is:

1. A pre-pit detecting apparatus for an optical recording medium having a recording surface provided with pre-pits which are repeatedly formed between tracks and carries information related to said tracks, comprising:

an optical detector having a light receiving surface divided into a first and second light receiving faces in the tangential direction of said track, for receiving the reflected light of a light beam radiated onto said recording surface on said first and second light receiving faces to output first and second light detection signals corresponding to respective amounts of the received light on said first and second light receiving faces;

a subtractor for calculating the difference between said first and second light detection signals output from said optical detector to generate a push-pull signal;

a binarization device for comparing said push-pull signal with a threshold value to generate a pre-pit detection signal; and a threshold setting device for sampling said push-pull signal to collect sample data for a predetermined period and for setting said threshold value between the maximum value of data corresponding to a track and the minimum value of data corresponding to a pre-pit, of the collected sample data.

2. A pre-pit detecting apparatus according to claim 1, wherein said threshold setting device sets said threshold value by adding a first predetermined value to said maximum value.

3. A pre-pit detecting apparatus according to claim 1, wherein said threshold setting device sets said threshold value by subtracting a second predetermined value from said minimum value.

4. A pre-pit detecting apparatus according to claim 1, wherein said threshold setting device sets the average of said maximum value and said minimum value as said threshold value.

5. A pre-pit detecting apparatus according to claim 1, wherein said threshold setting device includes a comparator for comparing said push-pull signal with a reference signal to generate a binary signal, a peak hold device for detecting and outputting a peak value of said push-pull signal on the negative side of said reference signal in response to the rising or falling edge of said binary signal, a delay device to delay said binary signal by a predetermined time, an A/D converter for sampling an output signal from said peak hold device by using said binary signal delayed by said delay device as a sampling clock to convert the sample data to a digital signal, a collecting device for collecting the digital signal output from said A/D converter as said sample data for said predetermined period, and a detector for detecting at least one of said maximum value and said minimum value from said collected sample data.

6. A pre-pit detecting apparatus according to claim 1, wherein said threshold setting device includes a comparator for comparing said push-pull signal with a reference signal to generate the binary signal, a peak hold device for detecting and outputting a peak value of said push-pull signal on the negative side of said reference signal in response to the rising or falling edge of said binary signal, a sample pulse generator for detecting a signal component corresponding to a predetermined longest mark recorded on said optical recording medium in accordance with said first and second light detection signals output from said optical detector so as to generate a first sample pulse when the signal component is detected, a delay device for generating a second sample pulse by delaying said first sample pulse by a predetermined time, a first A/D converter for sampling an output signal of said peak hold device to convert the sample data to a digital signal in response to said first sample pulse, a second A/D converter for sampling the output signal of said peak hold device to convert the sample data into digital signal in response to said second sample pulse, and a setting device, when the output digital signals from said first and second A/D converters have different values from each other, for setting a value of the output digital signal from said second A/D converter as the maximum value of a data value corresponding to said track and for setting a value of the output digital signal from said first A/D converter as the minimum value of a data value corresponding to said pre-pit.

7. A pre-pit detecting apparatus according to claim 6, wherein said sample pulse generator detects the signal component corresponding to said predetermined longest mark in accordance with an output signal of an adder for adding said first and second light detection signals.

8. A pre-pit detecting apparatus according to claim 6, wherein said predetermined longest mark represents a sync signal.

9. A pre-pit detecting apparatus according to claim 1, wherein said threshold setting device includes an oscilloscope for samples said push-pull signal to collect the sample data for said predetermined period and for storing the collected data in an internal memory, and for displaying a waveform of said push-pull signal based on the sample data stored in said internal memory, and a detector for detecting said maximum value and said minimum value from said sample data stored in said internal memory.

10. A pre-pit detection method for an optical recording medium having a recording surface provided with pre-pits which are repeatedly formed between tracks and carries information related to said tracks, comprising:

an optical detection step for receiving the reflected light of a light beam radiated onto said recording surface, on a light receiving surface having first and second light receiving faces divided in the tangent direction of said track, to output first and second light detection signals corresponding to respective amounts of the received light on said first and second light receiving faces;

a subtraction step for calculating the difference between said first and second light detection signals to generate a push-pull signal;

a binarization step for comparing said push-pull signal with a threshold value to generate a pre-pit detection signal; and a threshold setting step for sampling said push-pull signal to collect sample data for a predetermined period and for setting said threshold value between the maximum value of data corresponding to a track and the minimum value of data corresponding to a pre-pit, of the collected sample data.

11. A computer data signal embodied in a carrier wave and representing a series of instructing which cause a computer to perform steps to execute an detecting process in a pre-pit detecting apparatus for an optical recording medium having a recording surface provided with the pre-pits which are repeatedly formed between tracks and carries information related to said tracks, said steps comprising an optical detection step for receiving the reflected light of a light beam radiated onto said recording surface, on a light receiving surface having first and second light receiving faces divided in the tangent direction of said track, to output first and second light detection signals corresponding to respective amounts of the received light on said first and second light receiving faces; a subtraction step for calculating the difference between said first and second light detection signals to generate a push-pull signal; and a binarization step for comparing said push-pull signal with a threshold value to generate a pre-pit detection signal, the steps further comprising:

a threshold setting step for sampling said push-pull signal to collect sample data for a predetermined period and for setting said threshold value between the maximum value of data corresponding to a track and the minimum value of data corresponding to a pre-pit, of the collected sample data.

* * * * *